Oct. 19, 1965   J. J. LOCKSHAW   3,212,691

METHOD FOR DISTRIBUTING GLASS FIBERS

Filed March 13, 1963

INVENTOR.
JAMES J. LOCKSHAW
BY
ATTORNEY

United States Patent Office 3,212,691
Patented Oct. 19, 1965

3,212,691
METHOD FOR DISTRIBUTING GLASS FIBERS
James J. Lockshaw, 2882 Rome, Anaheim, Calif.
Filed Mar. 13, 1963, Ser. No. 264,964
4 Claims. (Cl. 226—7)

The present invention relates generally to methods and devices for distributing or laying glass fibers or filaments, and more particularly to means for initially separating the filaments of a given strand or fiber and thereafter causing such filaments to be distributed over a given surface.

Within recent years, considerable use has been made of glass fibers for covering or coating virtually any desired surface. It has been discovered that glass fibers and filaments can be shaped substantially as desired, and will provide a surface which is extremely strong and durable, being immune to many active chemicals and the like.

In providing a surface with a coating or covering of glass fibers, it is often necessary to provide a layer of glass filaments to the desired depth or thickness. Such glass fibers may be in the form of relatively large sheets of cloth wherein the various strands of glass filament are woven together. On the other hand, the glass filaments may not be woven together, but rather may be separated so as to be distributed over the surface in a more or less random fashion.

After the glass fibers or filaments have been properly positioned on the surface, suitable plastic resin having a catalyst or hardener is generally poured over the entire surface or painted thereon as desired. Such resin, in due course, sets up or solidifies thereby providing a hard surface of predetermined thickness which contains a plurality of glass fibers or filaments. As will be readily apparent to those persons skilled in the art, many variations from the above described sequence are possible in accordance with the objectives to be accomplished and the desires of the individual performing the work.

In addition to the aforementioned method of coating a surface with glass fibers or filaments, it is also possible to form structures of various designs and configurations of such material. In such event, the glass fibers or glass cloth and the plastic resin are applied to a suitable mold. After the resin sets up, the structure is removed from the mold to provide a structure which is composed solely of glass fibers and resin.

Normally, glass fibers or strands are composed of many individual filaments of glass, each of which is approximately the size of an elongated thread. Such filaments are loosely bonded together by sizing to provide a fiber which resembles a string. Normally, such filaments are not inter woven, but rather are arranged in generally parallel relation.

Heretofore, it has been extremely difficult to separate a fiber or strand of glass into its various filaments, a step frequently necessary in making fiber glass surfaces and products. For certain applications, the desired end product is not obtained with glass strands or cloth, but rather requires the use of relatively fine individual glass filaments.

It is an object of the present invention to provide a device which is operable to separate the various filaments of an elongated strand or fiber.

Another object of the present invention is to provide a device which is operable substantially continuously to break down a relatively long strand of glass into its constituent filaments.

Another object of the present invention is to provide a device as characterized above which will not break or in any other way mutilate the glass filaments during separation, but rather will leave them in their original separated condition and length.

A further object of the present invention is to provide a device as characterized above which is operable automatically to separate the various glass filaments, and which can be manually operated to quickly and easily distribute the elongated filaments over a given surface.

Another object of the present invention is to provide a device as characterized above which is pneumatically operated.

Another object of the present invention is to teach a method for applying glass fibers or filaments to a given surface.

A further object of the present invention is to teach a method for applying glass fibers or filaments as characterized above which employs fluid pressure for quickly and effectively separating the various glass filaments.

Another object of the present invention is to teach the construction of an article of manufacture wherein an annular chamber or cavity is provided by the assembly of two cooperating housing members.

Another object of the present invention is to provide a device as characterized above which is simple and inexpensive to manufacture, and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

Like reference characters indicate corresponding parts throughout the several views of the drawings.

Figure 4:
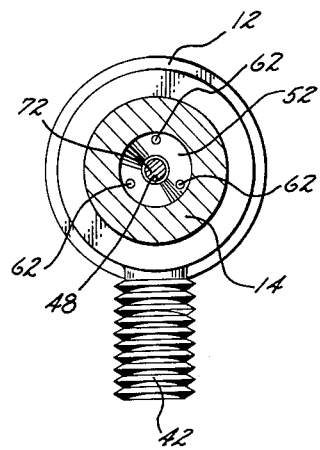
FIGURE 4 is a transverse sectional view taken substantially along line 4—4 of FIGURE 3.
Figure 2:
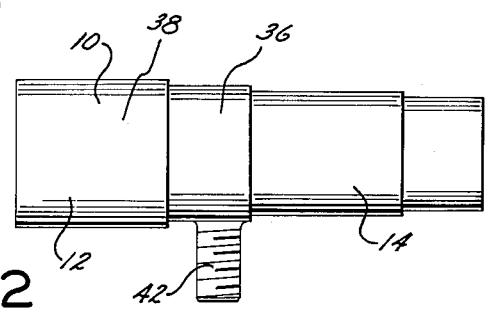
FIGURE 2 is a side elevational view of the subject device.
Figure 3:
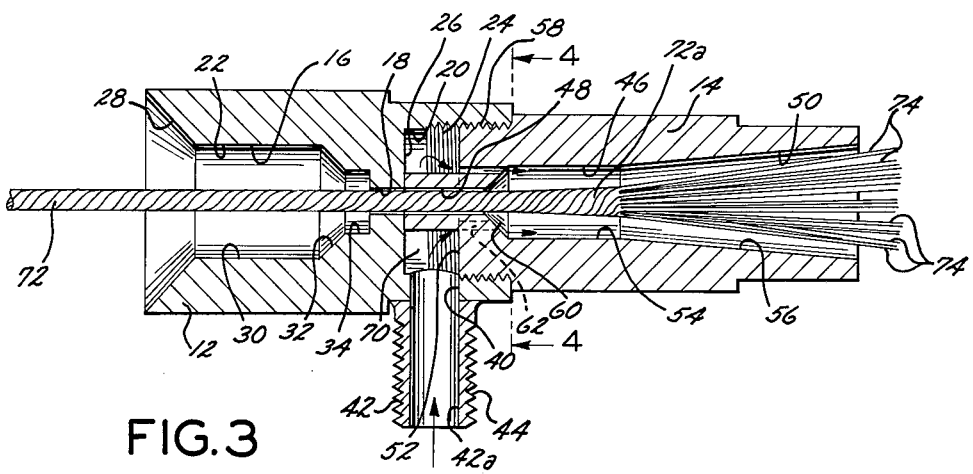
FIGURE 3 is a longitudinal sectional view through the center of the separating and distributing device of FIGURE 2.

Referring to FIGURES 2, 3, and 4 of the drawings, there is shown therein a preferred embodiment for illustrating the present invention. This embodiment comprises a generally tubular body or housing 10 which comprises two housing units or members 12 and 14.

Housing unit 14, which may be referred to as the forward housing unit as will hereinafter become more apparent, is generally tubular in shape having a cylindrical outer surface and being formed with a through opening 16. Such opening is provided with a reduced central portion 18 which separates an enlarged end portion 20 and an enlarged rearward end portion 22.

The forward end portion 20 of opening 16 is formed with internal fastening threads 24, and is separated from the reduced portion 18 by an annular shoulder 26.

The rearward end portion 22 of opening 16 is outwardly flared to provide a frusto-conical surface 28. Adjacent such surface 28 is a cylindrical surface 30 which terminates in another tapered surface 32. Intermediate the tapered surface 32 and the reduced portion 18 of through opening 16 is a cylindrical surface 34.

The outer peripheral surface of housing member 12 is generally cylindrical having a reduced forward surface 36 and an enlarged rearward cylindrical surface 38.

A lateral through opening 40 is provided in the wall of housing member 12 affording communication with the interior of end portion 20. A fitting 42 is secured to the housing unit 12 and has a through opening 42a for alignment with opening 40. Fitting 42 is secured to housing unit 12 in any desired manner as by welding, brazing, soldering or the like. External fastening threads 44 are formed on fitting 42 for receiving a hose or conduit connector as will hereinafter appear.

The forward housing unit 14 of device 10 is provided with a through opening 46 having a reduced rearward end portion 48 and a forward end portion 50.

End portion 48 of opening 46 is of reduced diameter corresponding to the diameter of the reduced portion 18 of through opening 16 formed in the rearward housing unit 12. A tapered or frusto-conical surface 52 is formed in opening 46 adjacent the cylindrical surface 48, said tapered surface 52 being flared outwardly as shown in FIGURE 3. Forming a part of through opening 46 adjacent the outwardly flared surface 52 is a cylindrical surface 54 which terminates at another outwardly flared tapered surface 56. The latter surface extends to the outer extremity of the device 10 and is formed with a relatively gradual taper as shown in FIGURE 3 of the drawings.

The outer peripheral surface of housing unit 14 is generally cylindrical in construction, the portion thereof adjacent the rearward end portion being provided with external fastening threads 58. Such threads, as shown in FIGURE 3, terminate short of the inner extremity of housing member 14 for purposes which will hereinafter be described in detail. The peripheral surface of unit 14 is reduced at the outer end portion.

Housing unit 14 is further formed with one or more fluid passageways or orifices which begin at the annular surface 60 and terminate at the tapered surface 52 of through opening 46. As shown most clearly in FIGURE 4 of the drawings, the embodiment selected for illustration of the present invention comprises three such orifices 62 equi-angularly positioned about the axis of through opening 46. It is desirable that the orifices 62 be substantially parallel with each other and with the axis of through opening 46. As will hereinafter appear in greater detail, this feature together with the outwardly flared or tapered surface 56 provides a very desirable function.

As shown most clearly in FIGURE 3 of the drawings, the housing units 12 and 14 are connected together by cooperation of the fastening threads 24 and 58. Due to the fact that the annular surface 60 of housing member 14 is spaced from the rearward end of such housing unit, an annular chamber 70 is provided merely by fastening housing member 14 to housing member 12 such that the rearward extremity of the former abuts against the annular surface 26 of member 12. Such annular chamber 70 communicates with the through opening 42a of fitting 42 through opening 40, and with the through opening 46 by virtue of the orifices 62.

Figure 1:
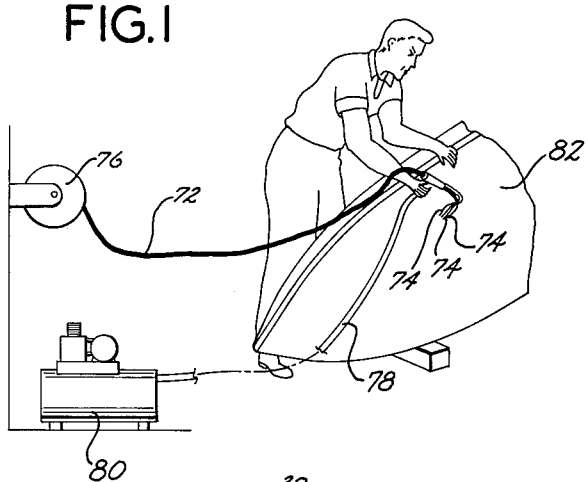
FIGURE 1 is a fragmentary perspective view of the subject device showing a method of applying glass filaments to a given surface.

As shown most clearly in FIGURE 1 of the drawings, the subject device is operable to separate a strand 72 of glass fibers into its various individual filaments 74. Such filaments are usually not interwoven but rather are arranged in generally parallel relation and are bonded together by sizing or the like. The strand 72 may be of substantially any desired length and may be stored on a drum or roll 76 mounted in a stationary position as shown in FIGURE 1. Such strand 72 is threaded through the device 10, through the aligned openings 16 and 46 of the housing units 12 and 14 respectively. The openings 18 and 48 should be of substantially identical diameter and so positioned in the respective housing units so as to be contiguously arranged when the housing units are assembled as above described.

The fitting 42 is connected to a flexible conduit 78 which leads from a compressor 80 or a storage tank for air or other fluid under pressure greater than ordinary atmospheric pressure. This arrangement enables fluid to be forced through the conduit 78 and opening 42a of fitting 42 to the annular chamber 70 formed by the housing units 12 and 14. From here, the fluid is forced through the orifices 62 into the through opening 46 of housing unit 14. With a strand 72 of glass filaments within the device 10, the pressurized air or other fluid is caused to be forced between the filaments while they are positioned within the cylindrical opening 54.

As such strand 72 moves through the unit 10, from left to right as shown in FIGURE 3, the portion 72a thereof which is subjected to air under pressure ultimately reaches the outwardly flared portion 56 of through opening 46. At this point the fluid pressure is permitted to expand due to the outwardly tapered surface 56 and the higher pressure within cylindrical portion 54 as compared with the existing atmospheric pressure. Such expansion of the air or other fluid carries with it the various filaments 74 of strand 72 thereby breaking the bond afforded by the sizing and separating them as shown most clearly in FIGURES 1 and 3.

Such filaments are relatively fine or small in diameter, and are relatively long depending upon the length of the strand 72. The separation of the various filaments, as above described, in no way harms or breaks them as might occur if they were mechanically separated.

As shown in FIGURE 1 of the drawings, the device 10, due to its design and configuration, can be directed toward the surface, in this case the hull 82 of a boat, to be covered with glass fibers or filaments. Merely by moving device 10 from side to side, it is possible to provide a layer of glass filaments on the surface to the desired depth. Thereafter the usual resins can be applied to the surface to afford the rigid surface structure desired.

It is thus seen that the present invention affords a unique method of providing a given surface with glass fibers to the desired depth. Also, this invention teaches a novel device which utilizes air pressure to separate the various glass filaments of a given strand.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. The method of separating filaments of an elongated strand of filaments held together by sizing or the like comprising the steps of, positioning said strand in a through opening the cross section of at least a portion of which is substantially constant for a predetermined distance and thereafter increases at a substantially constant rate, and causing fluid under pressure to be directed parallel and only parallel to said strand within the substantially constant cross section of said opening to prevent cross currents of fluid flow, the fluid flowing from the constant cross section to the increasing cross section of said opening, whereby the fluid is caused to expand and carry with it filaments of said strand to effect separation thereof.

2. The method of separating and distributing filaments of a continuous strand of filaments held together by sizing or the like comprising the steps of, positioning said strand for movement through an opening the cross section of which is substantially constant for a predetermined distance and thereafter increases at a substantially constant rate, and causing fluid under pressure to be directed parallel and only parallel to said strand within the substantially constant cross section of said opening to prevent cross currents of fluid flow, the fluid flowing from the constant cross section to the increasing cross section of said opening whereby the movement of fluid and the expansion thereof carries with it the filaments of said strand to effect separation and movement thereof through said opening.

3. The method of separating filaments of an elongated strand of filaments held together by sizing or the like comprising the steps of, positioning said strand in a through opening the cross section of at least a portion of which is substantially constant for a predetermined distance and thereafter increases at a substantially constant rate, and causing fluid under pressure to be directed parallel and only parallel to said strand at a plurality of equiangularly spaced locations about said strand within the substantially constant cross section of said opening to prevent cross currents of fluid flow, the fluid flowing from the constant cross section to the increasing cross section of said opening, whereby the fluid is caused to expand and carry with it filaments of said strand to effect separation thereof.

4. The method of feeding and separating the filaments of a substantially continuous elongated strand of filaments held together by sizing or the like comprising the steps of, positioning said strand in a through opening the cross section of which is substantially constant for a predetermined distance and thereafter increases at a substantially constant rate and causing fluid under pressure to be directed parallel and only parallel to said strand within the substantially constant cross section of said opening to prevent cross currents of fluid flow, the fluid flowing from the constant cross section to the increasing cross section of said opening, the decrease in fluid pressure in said opening caused by the increase in cross section thereof effecting expansion of said fluid therein and separation of the filaments of strand to thereby enable the fluid under pressure to create a force on said strand substantially parallel to the length thereof, whereby such strand is fed through said opening and the filaments thereof are continuously separated along the length thereof during such feeding operation.

References Cited by the Examiner

UNITED STATES PATENTS

| | | | |
|---|---|---|---|
| 1,770,011 | 7/30 | Poston | 239—336 |
| 1,876,610 | 9/32 | Case | 239—336 |
| 2,361,144 | 10/44 | Loepsinger | 239—8 |
| 2,419,365 | 4/47 | Nagel | 239—8 |
| 2,622,306 | 11/52 | Anderson | 226—97 |
| 2,639,487 | 5/53 | Kelley | 226—97 |
| 2,924,868 | 2/60 | Dyer. | |
| 3,077,415 | 2/63 | Ayers | 239—9 |
| 3,081,951 | 3/63 | Dyer et al. | |
| 3,096,225 | 7/63 | Carr et al. | 239—336 |
| 3,103,731 | 9/63 | Salyer et al. | |
| 3,107,057 | 10/63 | Hanusch | 239—336 |
| 3,110,950 | 10/63 | Yamamoto. | |
| 3,126,157 | 3/64 | Dickerson | 239—336 |
| 3,130,912 | 4/64 | Shelton | 239—336 |

M. HENSON WOOD, JR., *Primary Examiner.*

EVERETT W. KIRBY, *Examiner.*